(12) United States Patent
Ikeda

(10) Patent No.: US 6,421,087 B1
(45) Date of Patent: Jul. 16, 2002

(54) IMAGE PICKUP APPARATUS HAVING A SIGNAL PROCESSOR FOR GENERATING LUMINANCE AND CHROMINANCE SIGNALS IN ACCORDANCE WITH IMAGE PICKUP SIGNALS

(75) Inventor: Eiichiro Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/034,406

(22) Filed: Mar. 4, 1998

(30) Foreign Application Priority Data

Mar. 5, 1997 (JP) .............................................. 9-050197

(51) Int. Cl.[7] .............................................. H04N 5/228
(52) U.S. Cl. ...................................... 348/345; 348/234
(58) Field of Search ................................ 348/222, 234, 348/235, 237, 239, 272, 335, 340, 342, 343, 344, 360, 345; H04N 5/228

(56) References Cited

U.S. PATENT DOCUMENTS

| 4,746,972 A | * | 5/1988 | Takanashi et al. | ........... 348/238 |
| 4,805,028 A | * | 2/1989 | Nishioka et al. | ............ 348/342 |
| 4,823,186 A | * | 4/1989 | Muramatsu | .................. 348/236 |

* cited by examiner

Primary Examiner—Tuan Ho
(74) Attorney, Agent, or Firm—Fitzpatrick, Cella, Harper & Scinto

(57) ABSTRACT

An image pickup apparatus including an image pickup element for picking up an image and outputting an image pickup signal, a controller for performing a first photographing in an in-focus state to obtain a first image pickup signal and performing a second photographing in a state defocused by a predetermined amount from the in-focus state to obtain a second image pickup signal, and a signal processing circuit for generating a luminance signal in accordance with the first image pickup signal, and chrominance signals in accordance with the second image pickup signal.

31 Claims, 12 Drawing Sheets

FOCUS LENS GROUP

| Ma | Gr | Ma | Gr |
|----|----|----|----|
| Cy | Ye | Cy | Ye |
| Gr | Ma | Gr | Ma |
| Cy | Ye | Cy | Ye |

IN-FOCUS STATE $\delta$ = PERMITTED CONFUSION CIRCLE DIAMETER

PRE-FOCUS STATE $\Delta x$ = DEFOCUS AMOUNT
$\Delta y$ = BLURRING AMOUNT OF IMAGE PICKUP PLANE

POST-FOCUS STATE

LOW-PASS FILTER FOR Y SIGNAL

IMAGE PICKUP APPARATUS HAVING A SIGNAL PROCESSOR FOR GENERATING LUMINANCE AND CHROMINANCE SIGNALS IN ACCORDANCE WITH IMAGE PICKUP SIGNALS

BACKGROUND OF THE INVENTION

1. Field of the Invention

The present invention relates to an image pickup apparatus or an image processing apparatus such as a digital camera.

2. Related Background Art

Recent advancement of video apparatuses such as digital cameras is remarkable. Not only are they used merely as cameras, but also demands for using them as image input apparatuses of computers are strong and rapidly prevailing.

FIG. 1 is a block diagram showing the structure of a conventional single-plane digital camera. An object image (not shown) is focused via a lens 1 and an optical low-pass filter 14 onto a focal plane of an image pickup element 2.

A shutter release button for instructing image pickup is structured to be depressed by two steps. As a user half-depresses the shutter release button, the camera enters a pre-photographing state in which AE (auto-exposure), AF (auto-focussing) and the like are performed to determine an opening of an iris, a shutter speed, a focal position, and the like. As the user fully depresses it to the second step, the camera enters a real photographing state.

In the real photographing state, an object image entering the image pickup element 2 is photoelectrically converted into an image signal which is output to the next stage.

The image signal output from the image pickup element 2 is digitalized by an A/D converter 3 and supplied to a signal processing unit 10 whereat an image compression process such as JPEG is performed and thereafter the processed image signal is stored in a recording device.

In a single-plane type, color filters having layouts such as shown in FIG. 2 are disposed in front of the image pickup element in order to form color signals.

In FIG. 2, the left side shows a pixel layout of complementary color filters (Ma: magenta, Cy: cyan, Ye: yellow, G: green) and the right side shows a pixel layout of saturated color filters (R: red, G: green, B: blue).

Generally, according to the Nyquist theorem, an object image having a spatial frequency higher than half the sampling frequency N generates a low frequency signal in the form of aliasing distortions.

To avoid this, a low-pass filter (called an optical low-pass filter) for cutting frequencies higher than N/2 is disposed on the image pickup plane of an image pickup element, in order to mainly prevent color moire to be caused by color filters.

It is however obvious that using such a low-pass filter lowers a resolution, so that there is a demerit that an image of a high quality corresponding to the number of pixels of an image pickup element cannot be formed.

SUMMARY OF THE INVENTION

It is an object of the present invention to solve the above problems and provide an image pickup apparatus and an image processing apparatus capable of taking an image of a high quality without any defects such as color moire.

It is another object of the present invention to provide an image pickup apparatus having a simple structure capable of forming a color image of a high quality.

In order to achieve the above objects, a preferred embodiment of the present invention discloses an image pickup apparatus comprising: image pickup means for picking up an image and outputting an image pickup signal; control means for performing a first photographing in an in-focus state to obtain a first image pickup signal and performing a second photographing in a state defocused by a predetermined amount from the in-focus state to obtain a second image pickup signal; and signal processing means for generating a luminance signal in accordance with the first image pickup signal, and chrominance signals in accordance with the second image pickup signal.

It is another object of the present invention to provide an image pickup apparatus and an image processing apparatus capable of forming an image of high grade quality without fluctuation of luminance, color and resolution.

In order to achieve the above object, a preferred embodiment of the present invention discloses an image pickup apparatus comprising: means for inputting a first image pickup signal and a second image pickup signal both picked up in a relative state defocused by a predetermined amount; luminance signal generating means for generating a luminance signal from the first image pickup signal; chrominance signal generating means for generating chrominance signals from the second image pickup signal; and control mens for performing an iris priority photographing by fixing an iris while the first and second image pickup signals are picked up.

Another preferred embodiment of the invention discloses an image processing apparatus comprising: means for inputting a first image pickup signal and a second image pickup signal both picked up in a relative state defocused by a predetermined amount; luminance signal generating means for generating a luminance signal from the first image pickup signal; luminance step removing mens for removing a step of a level of the luminance signal; chrominance signal generating means for generating chrominance signals from the second image pickup signal; position difference correcting mens for correcting a relative position difference between the luminance signal with the removed luminance step and the other color difference signals; and output means for outputting the luminance and chrominance signals with the position difference being corrected by the position difference correcting means.

The other objects and features of the invention will become apparent from the following detailed description when read in conjunction with the accompanying drawings.

DETAILED DESCRIPTION OF THE PREFERRED EMBODIMENTS

Embodiments of the invention will be described in detail with reference to the accompanying drawings.

Figure 1:
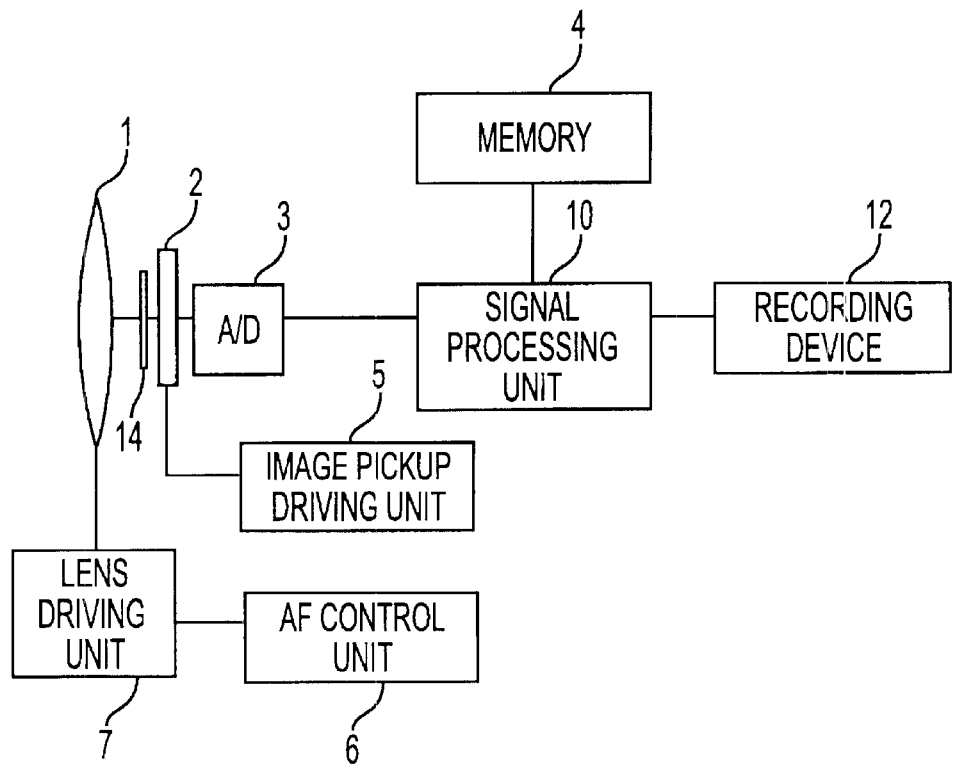
FIG. 1 is a block diagram showing the structure of a conventional digital camera.
Figure 2:
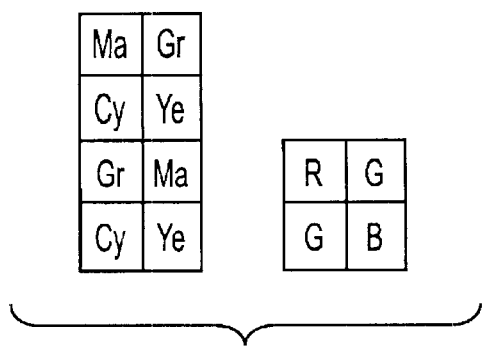
FIG. 2 is a diagram showing general layouts of color filters.
Figure 3:
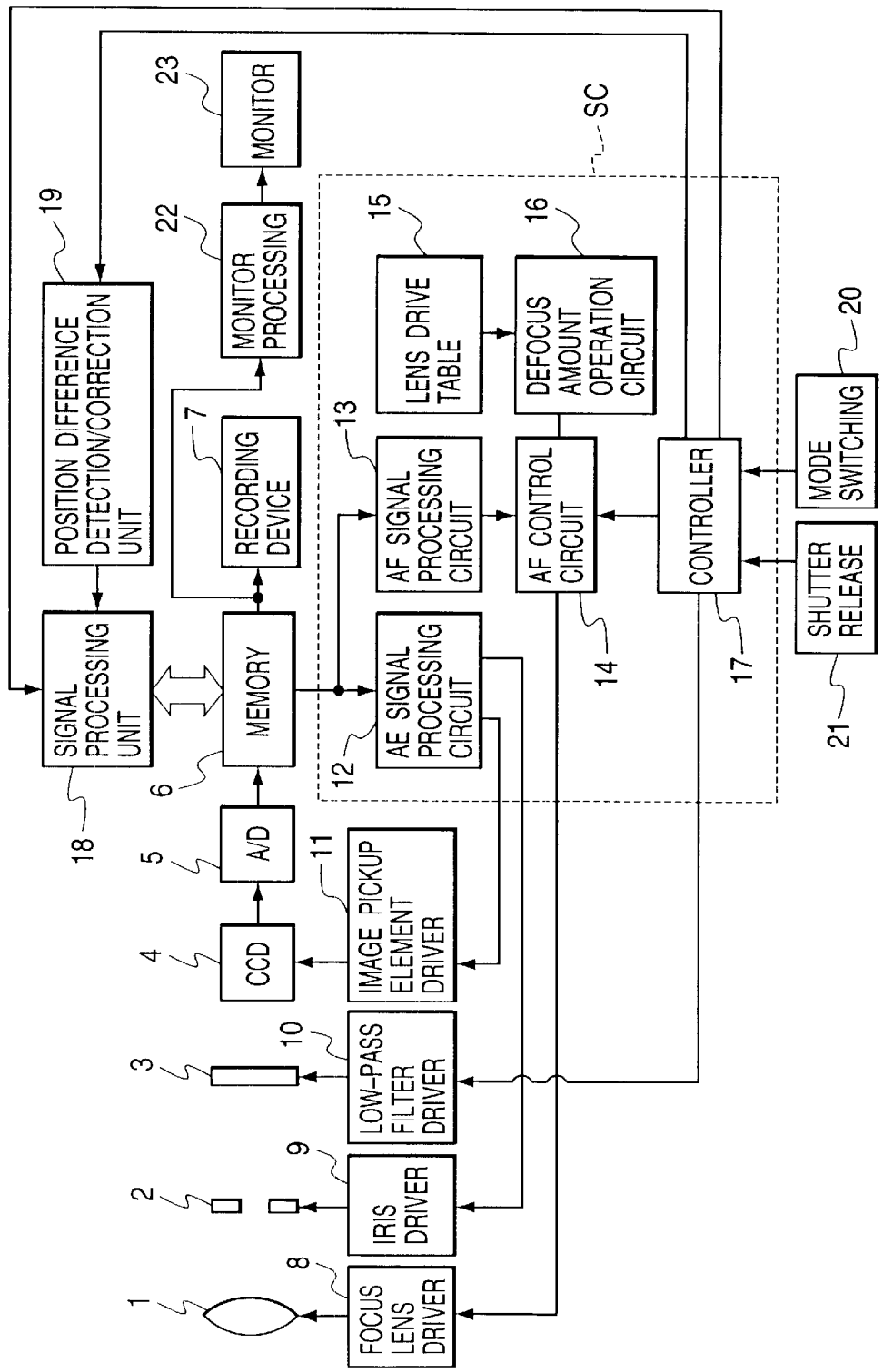
FIG. 3 is a block diagram showing the structure of a first embodiment of the invention.

FIG. 3 is a block diagram showing the structure of an electronic camera embodying the present invention.

Referring to FIG. 3, incident light upon an image pickup lens optical system 1 is focused via an iris 2 and an optical low-pass filter 3 onto a focal plane of an image pickup element 4 as image pickup means such as a CCD, and photoelectrically converted and output as an image signal.

Reference numeral 8 represents a focus lens driver for driving a focus lens of the image pickup lens optical system, reference numeral 9 represents an iris driver for driving the iris 2 to control a light amount, reference numeral 10 represents a filter driver for entering the optical low-pass filter into or removing it from an optical path of the image pickup lens optical system 1, and reference numeral 11 represents an image pickup element driver for supplying various clock pulses which drive the image pickup element 4. This image pickup element driver 11 is controlled by a controller to be described later to make the accumulation time of the image pickup element 4 variable to thereby constitute an electronic shutter.

An image signal output from the image pickup element 4 is converted into a digital signal by an A/D converter 5, temporarily stored in a memory 6, subjected to a predetermined process to be described later, and thereafter supplied to a recording device 7 to store it in a recording medium such as a semiconductor memory, a magnetic tape, and an optical disk.

An AE (exposure control) signal processing circuit 12 detects a luminance signal level from the image signal stored in the memory 6, and controls the iris driver 9 to set an opening diameter of the iris 2 so as to maintain the luminance signal level at a predetermined constant reference level. The AE signal processing circuit 12 also controls the image pickup element driver 11 to control the accumulation time (shutter speed) of the image pickup element 4.

An AF signal processing circuit 13 has a band-pass filter or the like for deriving, for example, high frequency components changing with a focal state out of the image signal, to thereby derive sharpness information of an object image as a focal point signal which is supplied to an AF control circuit 14 described hereinunder.

For the normal AF operation, the AF control circuit 14 determines a lens drive direction of increasing a sharpness of an object, in accordance with the focal point signal supplied from the AF signal processing circuit 13, and determines a lens drive speed in accordance with a level of the focal point signal to thus perform a hilltop climbing control and maximize the sharpness.

A lens drive table 15 stores a lens defocus amount corresponding to a lens iris value F relative to each zoom magnification factor and a pixel pitch of the image pickup element. This table is used for shifting an in-focus in order to prevent color moire during a high definition photographing mode, as will be later described.

In accordance with an iris value, a zoom magnification factor, an in-focus state and the like, a defocus amount operation unit 16 reads the information stored in the lens drive table 15 to calculate a defocus amount. In accordance with the calculated defocus amount, the AF control circuit 14 shifts the lens from the focal point by the calculated defocus amount. Defocus amount setting means is constituted of the defocus amount operation unit 16, the lens drive table 15 and the AF control circuit 14.

In the high definition photographing mode, a signal processing unit 18 constituting signal processing means generates a luminance signal Y from the image signal stored in the memory 6 and stores it again in the memory 6, during the first photographing. During the second photographing, it generates color difference signals CR(R-Y) and CB(B-Y) to synthesize them with the luminance signal Y and convert the signal into an RGB image signal. Thereafter, the RGB image signal is subjected to an image compression process such as JPEG and recorded in the recording device.

When the signal processing unit 18 synthesizes the luminance signal stored in the memory 6 during the first photographing with the chrominance signals (color difference signals) obtained during the second photographing, a position difference detection/correction unit 19 detects a relative position difference between two images and corrects it to thus perform a process of obtaining a color image without color shift.

When the signal processing unit 18 generates the luminance signal Y, a step of a luminance level (hereinafter called a luminance step) is generated in the colored area because of the influences of color filters. A method of removing this luminance step will be later described.

A controller 17 constituting control means operates as a system controller which collectively controls the whole system. The controller 17 selectively controls a normal photographing mode and a high definition photographing mode, in accordance with the state of a photographing mode selection switch 20. Although the details thereof will be later described, during the high definition photographing mode, the first and second photographing processes are performed as described previously, the AF control unit 14 and signal processing unit 18 are controlled to shift the in-focus position and generate the luminance and chrominance signals, and the position difference detection/correction unit 19 is controlled to correct the position difference and synthesize the luminance and chrominance signals.

In FIG. 3, although each element is shown as a discrete element in order to clarify the function of each element, a block surrounded by a broken line is actually realized by a single microcomputer.

The mode select switch 20 functions as a mode switching means for selecting either the normal photographing mode or the high definition photographing mode. Reference numeral 21 represents a shutter release switch, reference numeral 23 represents a monitor such as a liquid crystal display monitor for monitoring an image signal output from the memory 6, and reference numeral 22 represents a driver circuit for converting the image signal output from the memory 6 into a signal capable of being displayed on the monitor 23.

The structure of the embodiment has been described above. Next, specific operations and a process to be performed by each operation will be described.

Figure 4:
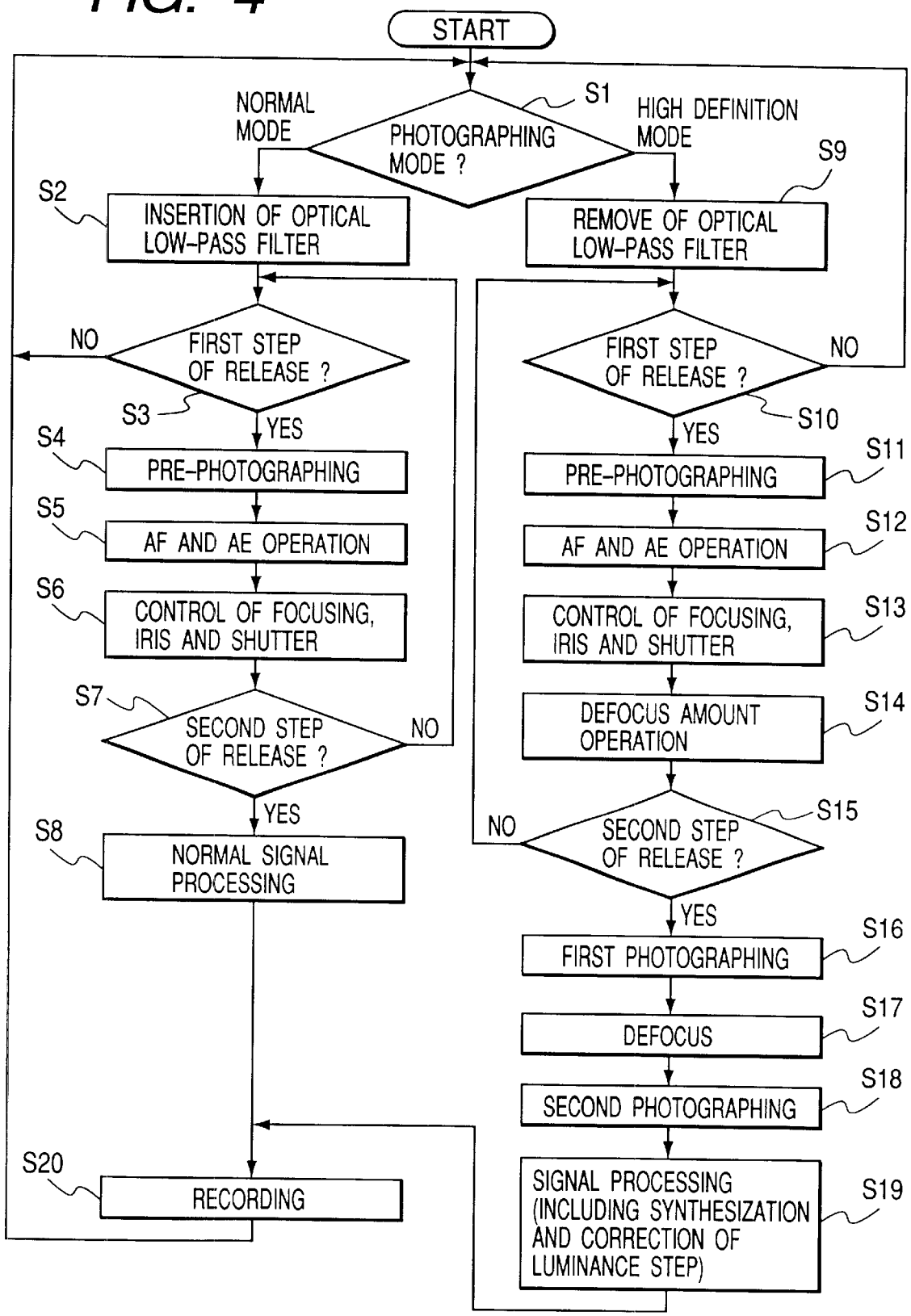
FIG. 4 is a flow chart illustrating an image pickup process according to the first embodiment of the invention.

FIG. 4 is a flow chart illustrating the operation processes of the electronic camera of this embodiment, the processes being controlled by the controller 17.

Referring to FIG. 4, as the operation starts, at Step S1 it is checked whether the mode selection switch 20 selects the normal photographing mode or the high definition photographing mode. If the normal photographing mode is selected, the flow advances to Step S2 and following Steps, whereas if the high precision photographing mode is selected, the flow advances to Step S9 and following Steps. This process corresponds to the operation of the mode switching means for selecting either the normal photographing mode or the high definition photographing mode.

Normal Photographing Mode

The normal photographing mode is used for the normal photographing of the electronic camera, such as when a motion of an object is slow and when a shutter speed priority photographing operation is performed.

If the normal photographing mode is selected at Step S1, the flow advances to a process at Step S2 whereat the optical low-pass filter is entered into the optical path of the image pickup optical system 1. Therefore, image deterioration to be caused by aliasing distortions can be prevented. In the case of the single-plane image pickup element, pixels are sampled at a predetermined pitch by color filters. Therefore, if there is incident light having a spatial frequency higher than a half the sampling frequency, aliasing distortions are formed. In order to avoid this, the optical low-pass filter is used.

Next, at Step S3 it is checked whether the shutter release button of the two-step depression type has been depressed (half-depressed) to the first step.

If it is judged that the shutter release button has been half-depressed, the flow advances to Step S4 whereat pre-photographing is performed at a predetermined iris value and a predetermined shutter speed for the exposure adjustment and for the focus adjustment. In this pre-photographing state, an image picked up with the image pickup element is displayed on the monitor as a moving image, and is not recorded in the recording medium.

In a process at Step S5, calculations for AE (exposure control) and AF (focus control) are performed, and thereafter the flow advances to a process at Step S6 whereat the iris, shutter, and focus control operations are performed in accordance with the data calculated at Step S5.

More in particular, the image signal output from the image pickup element and converted into a digital signal by the A/D converter, is supplied to the signal processing unit which determines the lens iris value F and shutter speed T so as to maintain an average value of luminance signal levels in a predetermined photometry range in an image frame, at a predetermined constant value.

The iris value F is supplied to the iris drive 9 to control the opening amount of the iris 2, whereas the shutter speed T is supplied to the image pickup element driver 11 to control the accumulation time of the image pickup element 4.

In this embodiment, the shutter speed T is controlled by the electronic shutter which controls the charge accumulation time of the image pickup element 4. Instead, a mechanical shutter may be used.

This pre-photographing state continues while the shutter release button is half-depressed. In the case of an NTSC video signal, one field image is formed in 1/60 second and one frame image is formed in 1/30 second.

The image signal output from the image pickup element 4 at a period of 1/60 second is supplied via the A/D converter 5 and memory 6 to the AF control unit whereat, for example, an unrepresented band-pass filter or the like derives high frequency components from the image signal changing with a focal state to thereby perform a so-called "hilltop climbing" control to maximize the level of high frequency components and drive the lens to the in-focus state by the iris driver.

An AF method is not limited only to a method of detecting an in-focus state from the image signal, but an external light sensor dedicated to AF may be used.

Next, at Step S7 it is checked whether the shutter release button has been depressed to the second step. If it is judged that the second-step depression has been effected, the flow advances to Step S20 whereat the image picked up at the depression timing is stored in the memory 6, and the signal processing unit 18 generates general luminance and chrominance signals (color difference signals) to record a still image in the recording device.

High Definition Photographing Mode

Next, the high definition photographing mode selected at Step S1 will be described.

In the high precision photographing mode of this invention, the luminance signal is picked up in the in-focus state without the optical low-pass filter, the chrominance signals are picked up in an out-of-focus state not allowing moire (at a lower spatial frequency), and the luminance and chrominance signals are synthesized so that an image signal having a high resolution without moire can be generated.

If the high definition photographing mode is selected at Step S1, the flow advances to Step S9 whereat the optical low-pass filter is moved to the outside of the optical path of the photographing optical system.

If the shutter release button has been half-depressed at Step S10, the pre-photographing is performed at Step S11 to start photographing. During this period, the image is displayed on the liquid crystal monitor 23.

Similar to the above-described normal photographing mode, at Steps S12 and S13 the focus control is performed in accordance with the high frequency components in the luminance signal, and the iris value F and shutter speed T are determined based on which the photographing operation is controlled.

The following processes are characteristic to the present invention. In this case, the lens drive amount for defocussing, i.e., defocus amount so as not to form color moire even if the optical low-pass filter 3 is retracted from the optical path, has been calculated already at Step S14.

In the high definition photographing mode, the luminance signal only is picked up in the in-focus state, the chrominance signals are thereafter picked up in an out-of-focus state not allowing moire (at a lower spatial frequency), and the luminance and chrominance signals are synthesized so that an image signal having a high resolution without moire can be generated.

Next, if it is judged at Step S15 that the shutter release button has been depressed to the second step to instruct the main photographing start, then the flow advances to the main photographing at Step S16 and following Steps.

As described above, in the processes at Steps S11 to S13, the focus detection and photometry operations are performed so that the lens is moved to an in-focus position and the iris value F and shutter speed T are determined.

In order that a high definition color image without color moire is picked up in the processes at Step S16 and following Steps, a high definition luminance signal is picked up during the first photographing and stored in the memory, the chrominance signals are picked up during the second photographing in an out-of-focus state not allowing color moire, and the luminance and chrominance signals are synthesized to form an image of a high definition without color moire.

First, at Step S14, a lens defocus amount (blurring amount) is calculated so as to form an image signal in an out-of-focus state not allowing moire.

Specifically, the defocus amount determining means reads the pre-defocus amount stored in the lens drive table 15 in correspondence with the iris value F determined by the pre-photographing. The defocus amount not allowing color moire at the current iris value and zoom magnification factor is calculated from the current zoom magnification factor and pre-defocus amount.

As described previously, the lens drive table 15 stores a lens defocus amount (blurring amount) corresponding to a lens iris value F relative to each zoom magnification factor and a pixel pitch of the image pickup element. A specific method of determining this defocus amount will be later described.

At Step S16 the iris opening and charge accumulation time are determined in accordance with the iris value F and shutter speed T determined during the pre-photographing, and the first photographing is performed under the conditions that the lens is moved to the in-focus position by the AF control unit 14.

Charges are accumulated on the image pickup element 4, transferred in the vertical and horizontal directions, and converted by the A/D converter 5 into a digital signal.

In parallel with the charge transfer by the image pickup element 4, at Step S17 information of the defocus amount is supplied from the defocus amount operation unit 16 to the AF control unit 14 to move the lens from the in-focus state by the defocus amount for the second photographing. This lens motion is performed for defocusing the focus to the extent that color moire is not formed, as described earlier.

The lens defocusing direction is a pre-focus direction if an object is a non-planar object. An object more on the camera side than a main object is generally rare. It is therefore possible not to focus a partial area of the object by using the pre-focus. The image signal during the first photographing after the charge transfer and A/D conversion is stored in the memory 6. In this case, the signal may be stored in an external recording medium in order to reserve the space of the internal memory.

The first image signal stored in the memory 6 is supplied to the signal processing unit 18 which then generates the luminance signal Y and stores it again in the memory 6.

When the luminance signal Y is generated, a luminance step is formed in the colored area because of the influences of color filters of the image pickup element 4. In this invention, the luminance signal is generated by removing the luminance step by the luminance step removing method to be described later.

After the electric charges of all pixels on the image pickup element 4 are transferred and the lens is defocused during the first photographing, at Step S18 the second photographing is performed at the image pickup element 2. Similar to the first photographing, the second image signal is stored in the memory 6.

At Step S19, the second image signal is supplied to the signal processing unit 18 which generates color difference signals CR(R-Y) and CD(B-Y), and the position difference detection/correction unit 19 corrects the image position difference relative to the luminance signal Y already recorded in the memory 6.

Thereafter, an RGB image signal is generated in accordance with the corrected color difference signals CRr and CBb and luminance signal Y, the signal processing unit 18 performs a compression process such as JPEG, the image signal is read from the memory 6, and at Step S20 it is recorded in the recording device 7.

Conversion from CRr, CBb and Y signals into the RGB image signal is given by the following equations.

$$R = Y + CRr$$

$$B = Y + CRb$$

$$G = (Y - 0.3R - 0.11B)/0.59$$

As described above, in the high definition photographing mode, the luminance signal is generated in a perfect in-focus state, and the chrominance signals are generated in a defocus state from the in-focus state not allowing moire, and the position difference between two images is corrected. It is therefore possible to form a color image of high definition and high quality without color moire.

In the above-described high definition photographing mode, during the first photographing mode for generating the luminance signal and the second photographing mode for generating the chrominance signals, the exposure control (iris priority photographing) is performed by an electronic shutter or a mechanical shutter by fixing the iris value. This is because the focal point is shifted by a predetermined defocus amount between the luminance signal photographing and the chrominance signal photographing, and because the defocus amount changes if the iris value changes and hence a sensitivity changes. These processes are controlled by a control program of the controller 17.

Figures 5A, 5B:
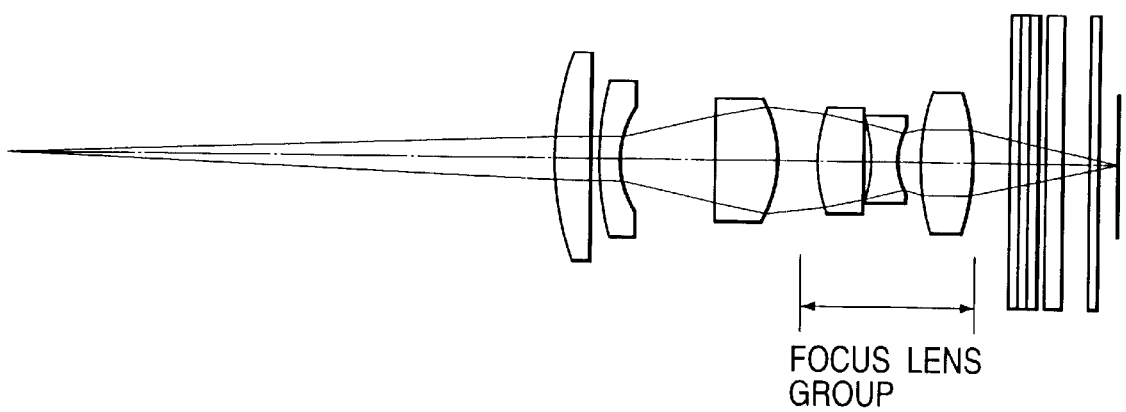
FIGS. 5A and 5B are diagrams illustrating an image pickup lens group and a filter layout.

Next, the structure of the defocus amount determining means which is one of the features of this invention will be described. FIG. 5A shows the structure of an image pickup lens optical system of the electronic camera of this embodiment. In order to achieve an in-focus state, lenses of the focus lens group shown in FIG. 5A are moved.

FIG. 5B shows a layout of color filters attached to the pixels of an image pickup element. Generally, according to the Nyquist theorem, an object image having a spatial frequency higher than a half the sampling frequency N generates a low frequency signal in the form of aliasing distortions.

To avoid this, a low-pass filter (called an optical low-pass filter) for cutting frequencies higher than N/2 is disposed on the image pickup plane of an image pickup element.

In the case of the color filter layout shown in FIG. 5B, the same color pixel is disposed at every second pixel position so that filters to blur two pixels are used. It is however obvious that using such a low-pass filter lowers a resolution.

In the present invention, the luminance signal is generated with high definition in an in-focus state without using the optical low pass filter and means for removing the luminance step to be caused by the color filter is provided. Accordingly, a luminance signal with high definition and without luminance level variation can be generated.

As will be later described, means for removing the luminance step includes means for filtering frequencies at which the luminance step is formed, means for filtering only the colored area by referring to the color signals obtained from the second image pickup signal, and means for filtering by referring to nearby pixels.

Figure 6A:
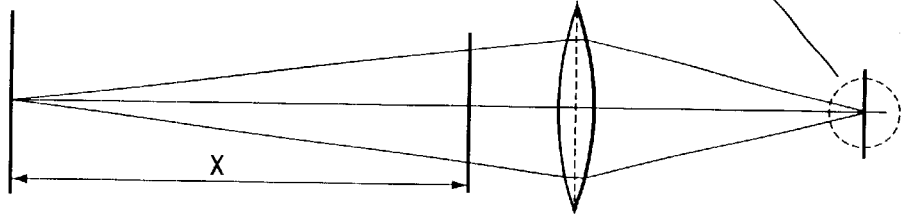
FIGS. 6A, 6B and 6C are diagrams illustrating the structures and operations of defocusing/focusing means.
Figure 6B:
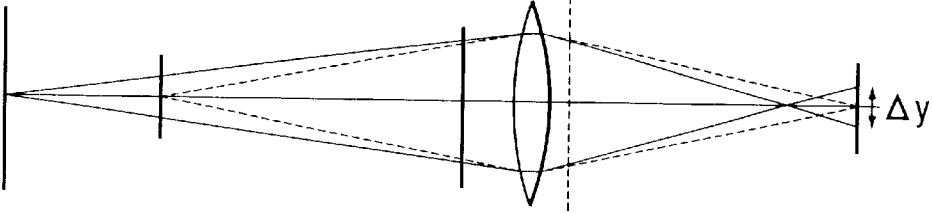
Figure 6C:
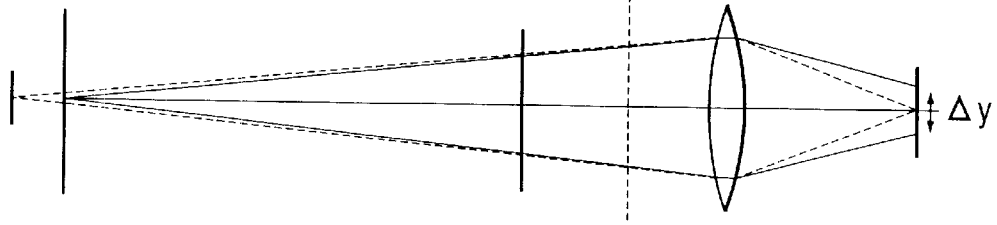

The chrominance signals are picked up in an out-of-focus state not allowing color moire. FIGS. 6A to 6C illustrate the focusing operation of the image pickup lens optical system shown in FIG. 5A.

FIG. 6A shows an in-focus state, FIG. 6B shows a pre-focus state focusing a position in front of a main object, and FIG. 6C shows a post-focus state.

An allowable minimum diameter δ of a circle of confusion on an image pickup plane of the image pickup element 4 and the pixel pitch Δp of the image pickup element 4 are set as:

$$\delta = \Delta p$$

It is defined that the in-focus state is obtained when $\Delta y \leq \delta$ where Δy is a blurring amount at an image pickup plane. In order not to generate moire in the color filter layout shown in FIG. 6B, the focus lens is moved by about Δx so that the blurring amount Δy at the image pickup plane becomes Δy=δ×2.

The larger the Δx, the more the image is unsharpened or blurred. However, as the blurring amount becomes large, the blurring amount Δy at the image pickup plane becomes large so that bleeding occurs and the image quality is lowered considerably.

Although the blurring amount Δy changes with an image height, if the defocus amount is determined by using a value of about 70% of the image height, good results can be obtained.

In this embodiment, the lens driver table stores the defocus amount Δx determined in accordance with the pixel pitch of the image pickup element and the lens F value, i.e., depth of focus. By using this table, an optimum defocus amount Δx can be determined quickly and correctly during photographing.

Also in the case of a zoom lens, by using the defocus amount Δx predetermined at a certain zoom magnification factor Z and the sensitivity at a focal distance at the magnification factor Z, the defocus amount Δx' suitable for the magnification factor can be determined.

The luminance step removing method of the embodiment will be described hereinunder. According to the Nyquist theorem, if the signal bandwidth of an original image is not lowered more than a half the sampling frequency N, aliasing distortions are generated.

In the electronic camera of this embodiment, since the optical low-pass filter for cutting the bandwidth of an original image is not used and the color filters such as those shown in FIG. 5B are used, the luminance signal has aliasing distortions and the luminance step caused by a gain difference between color filters, so that the chrominance signals have aliasing distortions.

As described previously, color moire of the chrominance signals is eliminated by photographing an object in an out-of-focus state and lowering the spatial frequency.

Since the luminance signal is picked up in an in-focus state, both the luminance moire and luminance step caused by color filters are generated. Although the former does not become so much conspicuous as the number of pixels of the image pickup element increases, the latter lowers the image quality. The luminance step removing method will be described specifically.

Luminance Step Removing Method 1

Figure 7:
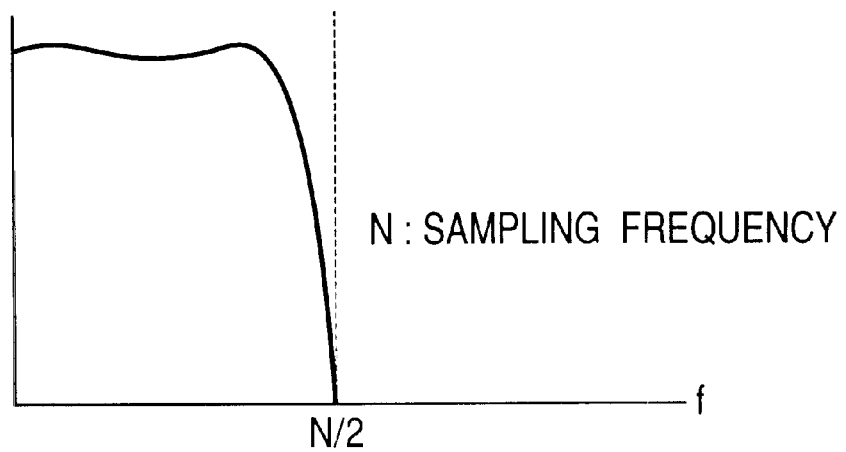
FIG. 7 is a diagram showing the characteristics of a luminance signal (Y) low-pass filter.

The first signal obtained from the image pickup element and digitized is passed through the low-pass filter having the characteristics shown in FIG. 7 to thereby remove the luminance step. For example, a one-dimensional digital filter having the seven taps (1, −3, 5, 18, 5, −3, 1)/24 is used in both the vertical and horizontal directions.

Since the low-pass filter is used, the resolution is somewhat lowered inevitably. However, the calculation becomes simple. In this embodiment, although a one-dimensional filter is used, a two-dimensional filter may be used without any practical problem.

Luminance Step Removing Method 2(a)

The chrominance signals are generated from an image signal picked up in an out-of-focus state not allowing moire. In order to prevent color bleeding to be caused by excessive blurring, this excessive blurring is not performed.

Namely, since the table stores the optimum defocus amount (the blurring amount at the image pickup plane is about a twofold of the diameter of a circle of confusion), the second image pickup signal, i.e, the chrominance signal is not so bad and is almost equal to an image signal picked up in the in-focus state by using the optical low-pass filter.

The luminance step is formed in the colored area. Only the colored pixels detected by referring to the chrominance signal generated from the second image pickup signal at the same position as the first image pickup signal, are filtered or the gain of only each colored pixel is adjusted.

Figure 8:
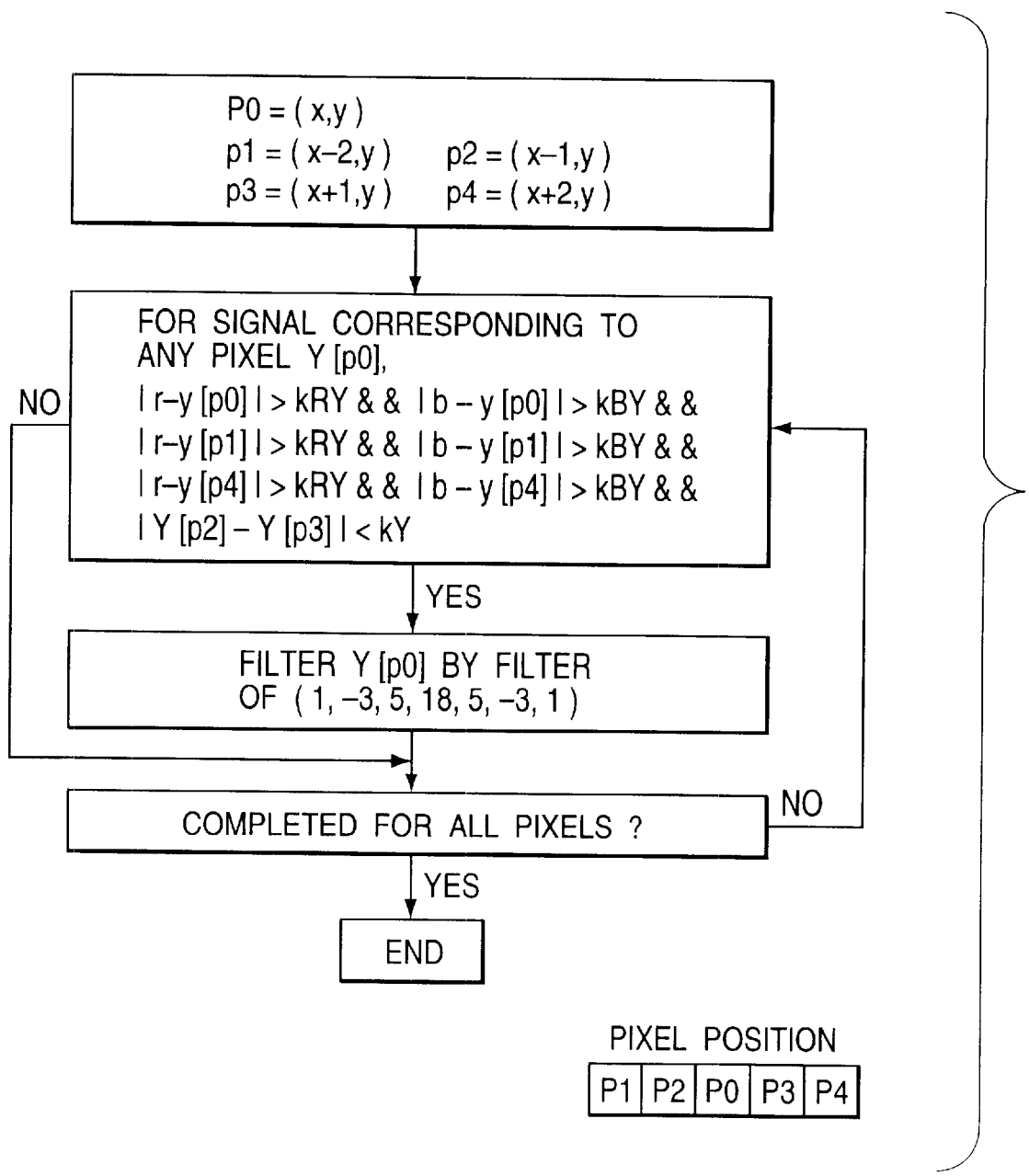
FIG. 8 is a flow chart illustrating an operation of a luminance step removal method (2a).

FIG. 8 is a flow chart illustrating the operation of filtering only colored pixels detected by referring to the second image pickup signal at the same position as the first image pickup signal. A one-dimensional filter shown in FIG. 8 is used.

(1) A target pixel P0 and nearby pixels P1 to P4 are determined.

(2) Filtering is performed if the following two conditions are satisfied, by referring to the several pixels before and after the target pixel (in this embodiment, one pixel before and after the target pixel). The two conditions are that the color difference signal value is larger than a predetermined value (kRY, kBY) (colored area) and that a difference between the nearby pixels P2 and P3 is equal to or smaller than a predetermined value (edge discrimination).

(3) The above processes are performed both in the vertical and horizontal directions.

Luminance Step Removing Method 2(b)

Figure 9:
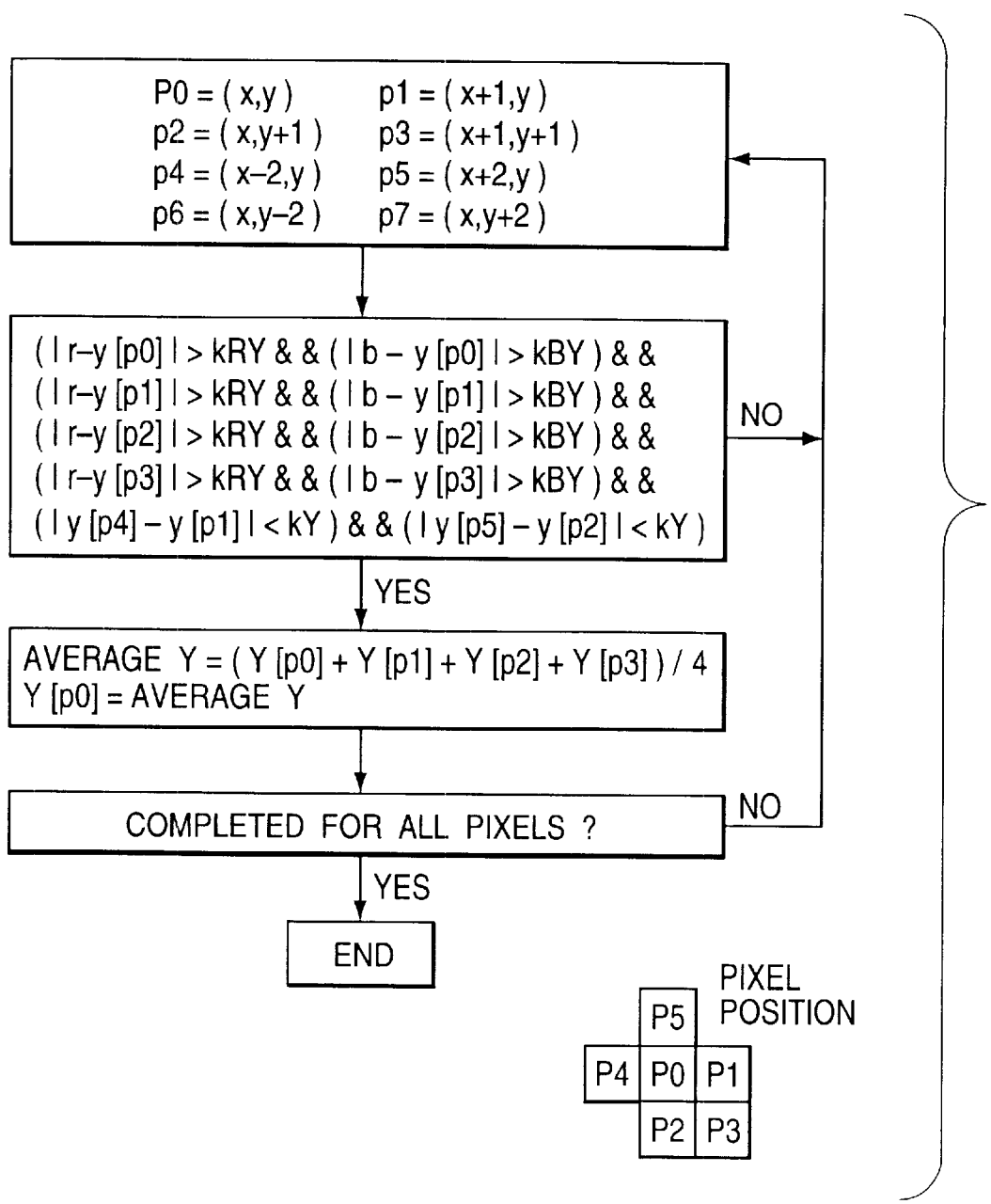
FIG. 9 is a flow chart illustrating an operation of a luminance step removal method (2b).

FIG. 9 is a flow chart illustrating the operation of adjusting the gain of only a colored pixel detected by referring to the second image pickup signal at the same position as the first image pickup signal.

(1) A target pixel P0 and nearby pixels P1 to P5 are determined.

(2) The value of the target pixel is set to an average value of four pixels P0 to P3 if the following two conditions are satisfied. The two conditions are that the color difference signal values P0 to P3 are larger than a predetermined value (kRY, kBY) (colored area) and that the pixel is not at an edge, as judged from signals (P1, P4) and (P2, P5).

Edge Judgement

Since only the colored flat area is filtered, the resolution is not lowered as compared with the luminance step removing method 1.

Luminance Step Removing Method 3

The values of the same color pixels near the target pixel are compared. If the values are the same, it is assumed that the area is a flat area, and the target pixel value is corrected by nearby pixel values of different colors.

Figure 10:
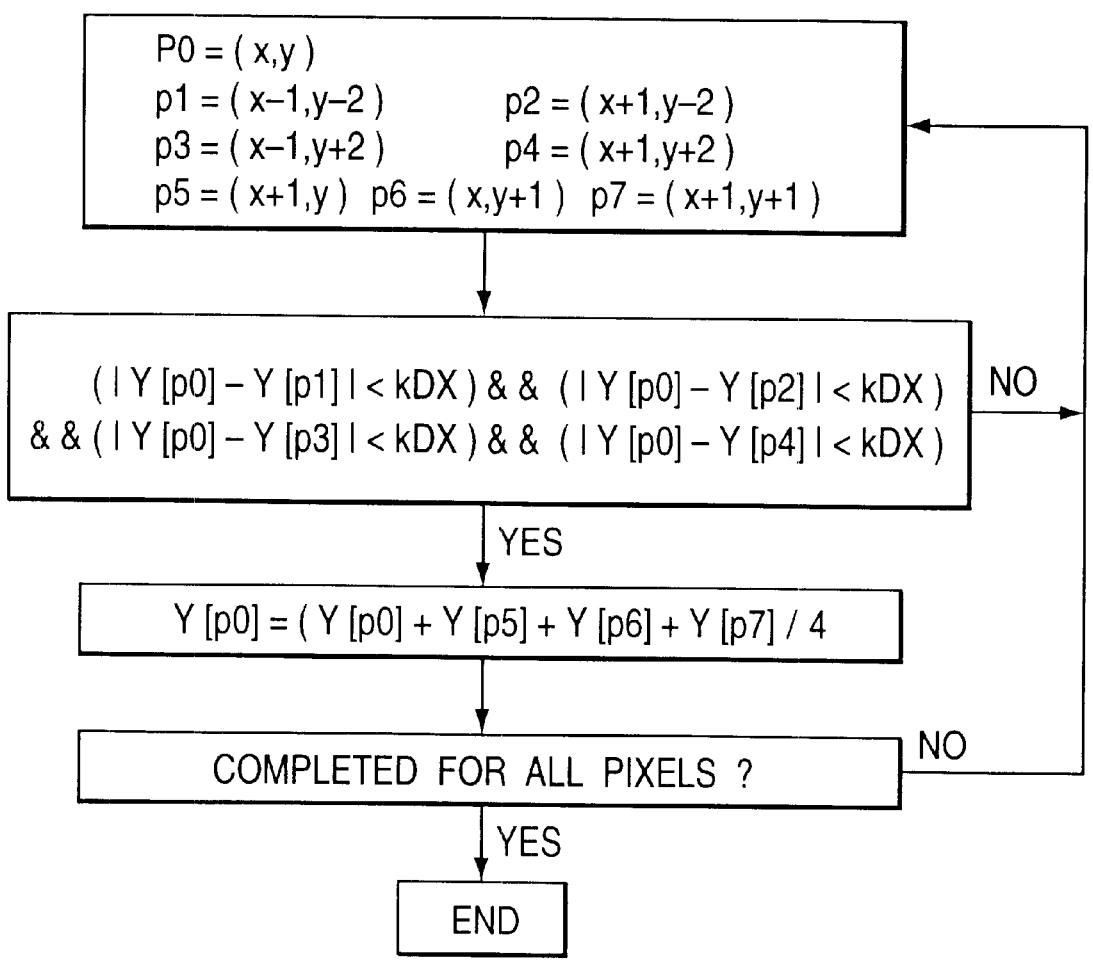
FIG. 10 is a flow chart illustrating an operation of a luminance step removal method (3).

FIG. 10 is a flow chart illustrating this method.

(1) A target pixel P0, nearby pixels P1 to P4 of the same color, and nearby pixels P5 to P7 of different colors are determined.

(2) Absolute values of differences of pixel values between P0 to P4 are calculated. If all the values are smaller than a predetermined value, it is assumed that the area is a flat area.

(3) If it is assumed that the area is a flat area, the luminance level Y (0) of the target pixel is set to an average value of four pixels P0, P5, P6, and P7.

(4) The above processes (1)–(3) are repeated for all pixels.

With this method, although there is some load of calculations, the resolution is improved more than the luminance step removing method 1, and the memory capacity can be reduced because the chrominance signals are not referred as in the case of the luminance step removing method 2.

Position Difference Detection/Correction Means

Next, a process of detecting and correcting a relative position difference between the luminance signal generated from the first image pickup and the chrominance signals (color difference signals) generated from the second image pickup.

In the image pickup apparatus of this invention, the luminance signal is generated from the first image pickup signal and the chrominance signals are generated from the second image pickup signal.

In this case, there is a time lag between the first and second image pickup signals. Therefore, if hand-held photographing is performed, the image position may be shifted. The image position may also be shifted by drive fluctuation, backlash, errors and the like respectively of a lens defocusing mechanism.

In order to correct the image position shift to be caused by these factors, the position difference detection/correction means is provided.

Figure 11:
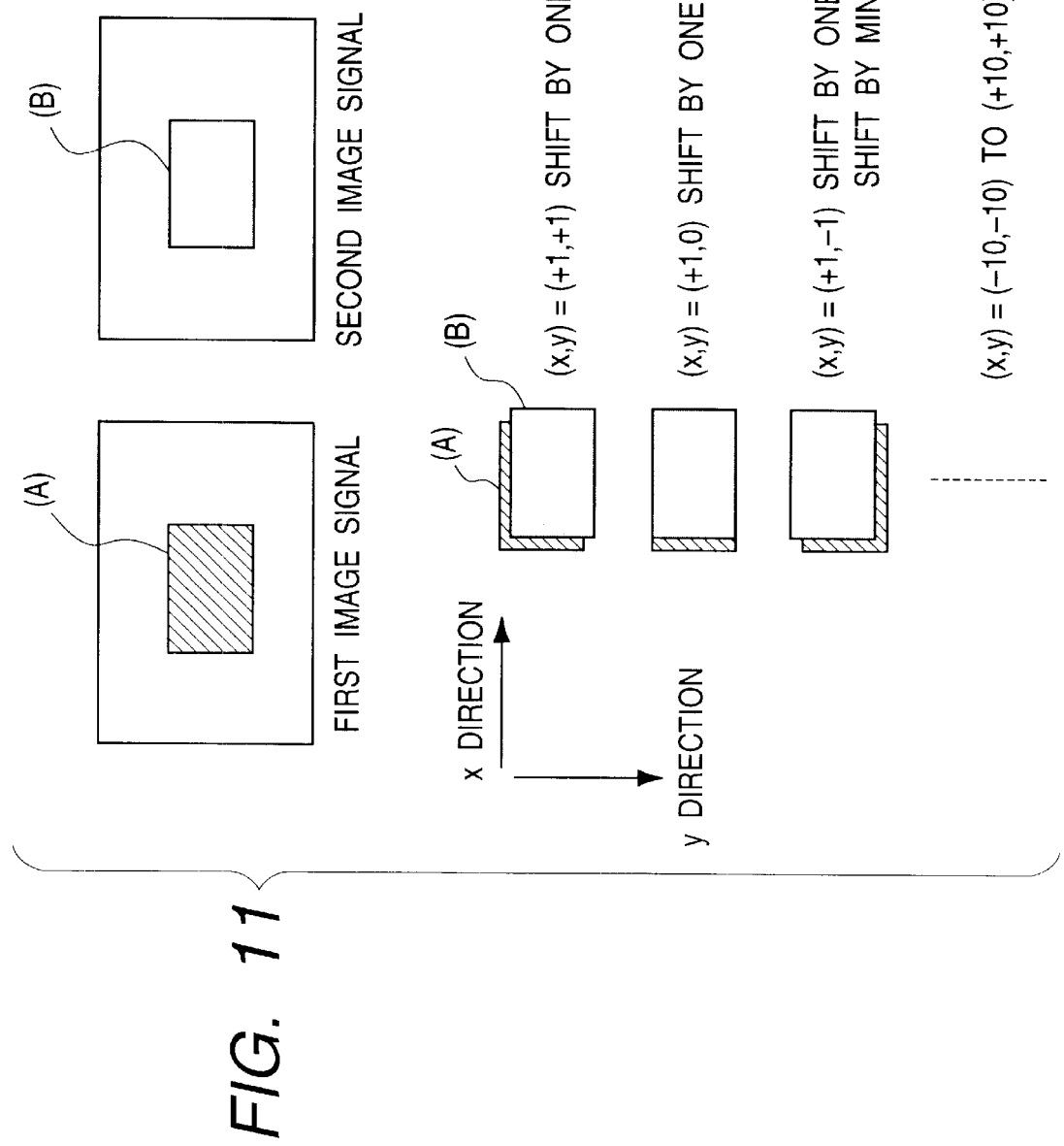
FIG. 11 is a diagram illustrating a position difference detecting method of the invention.

FIG. 11 is a diagram illustrating a concept of the position difference detection method of this embodiment.

(1) Derived are an arbitrary area (A) of the first image pickup signal and an area (B) at the same coordinate position as the area (A), the area (B) being formed by the Y signal obtained by the following equation:

$$Y = 0.3R + 0.59G + 0.11B$$

(2) As shown in FIG. 11, the areas (A) and (B) are shifted by +/− several pixels in the x- and y-axis directions. A sum of absolute values of differences between luminance signals in the superposed area is calculated.

(3) The x and y values when the sum of absolute values of differences obtained at (2) becomes minimum, are used as shift amounts.

As above, the position difference amount can be detected from differences of luminance between two pixels.

These processes are executed mainly by the position difference detection/correction unit 19 shown in FIG. 3.

According to the first embodiment described above, the first image pickup signal is obtained in an in-focus state without using the optical low-pass filter, and the second image pickup signal is obtained in an out-of-focus state. The luminance signal is generated from the first image pickup signal, and the chrominance signals are generated from the second image pickup signal. Accordingly, an image with a good resolution can be formed.

The lens driver table is provided which stores an optimum defocus amount Δx relative to the lens F value and a pixel pitch of the image pickup element. Accordingly, a synthesized image with a good quality and without color bleeding during the synthesis with the luminance signal can be formed.

Used as means for removing a luminance step to be caused by color filters when the luminance signal is generated, are means for filtering the first image pickup signal to cut the frequency at which the luminance step is generated, means for filtering only the colored area by referring to the second image pickup signal, means for adjusting the gain for each colored pixel value, and means for filtering a flat area or adjusting the gain for the flat area, the flat area being discriminated from an edge by referring to pixels near a target pixel in the first image pickup signal. Accordingly, a luminance signal of a high resolution without luminance step can be generated.

Figure 12:
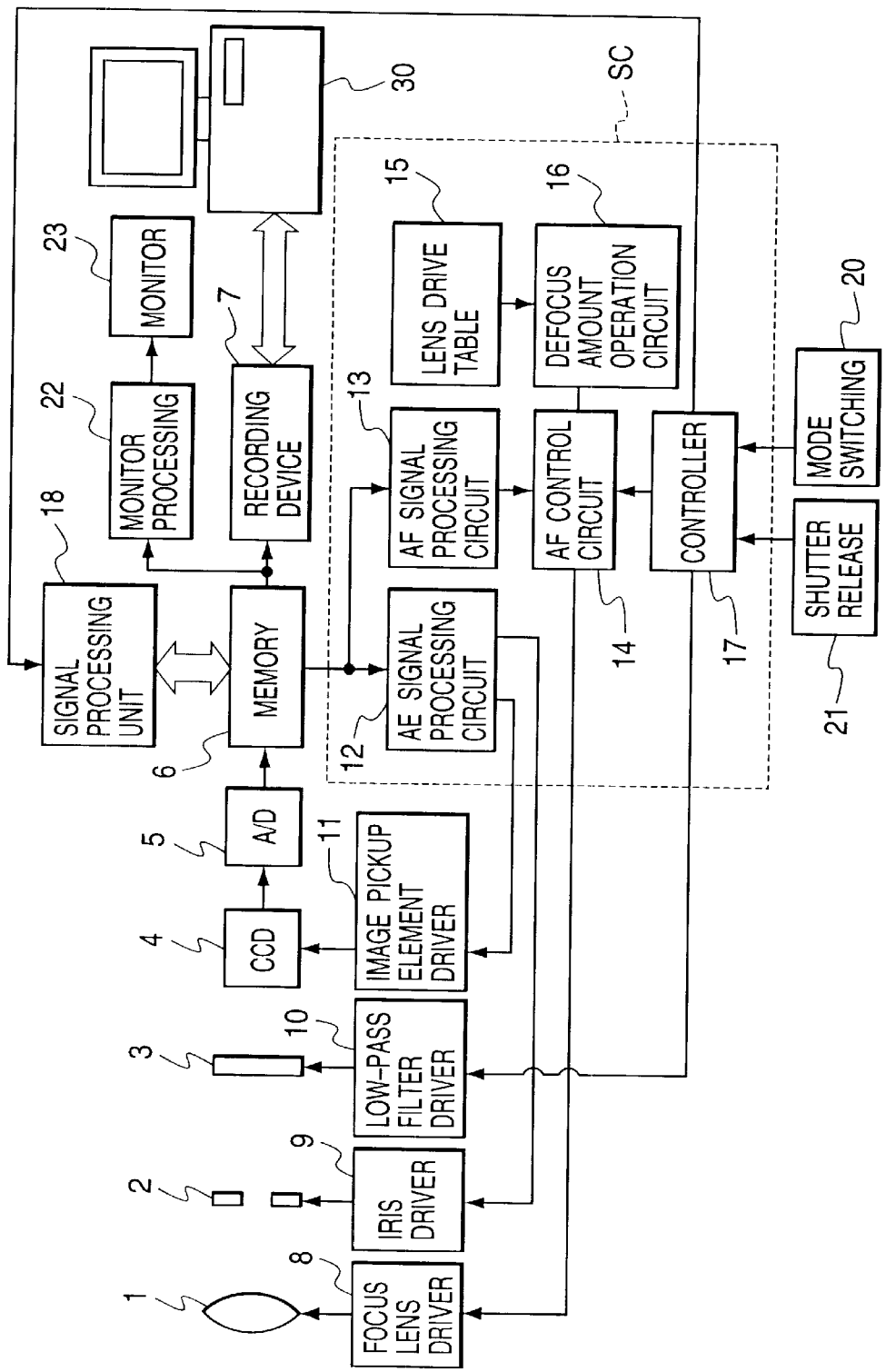
FIG. 12 is a block diagram showing the structure of a second embodiment of the invention.
Figure 13:
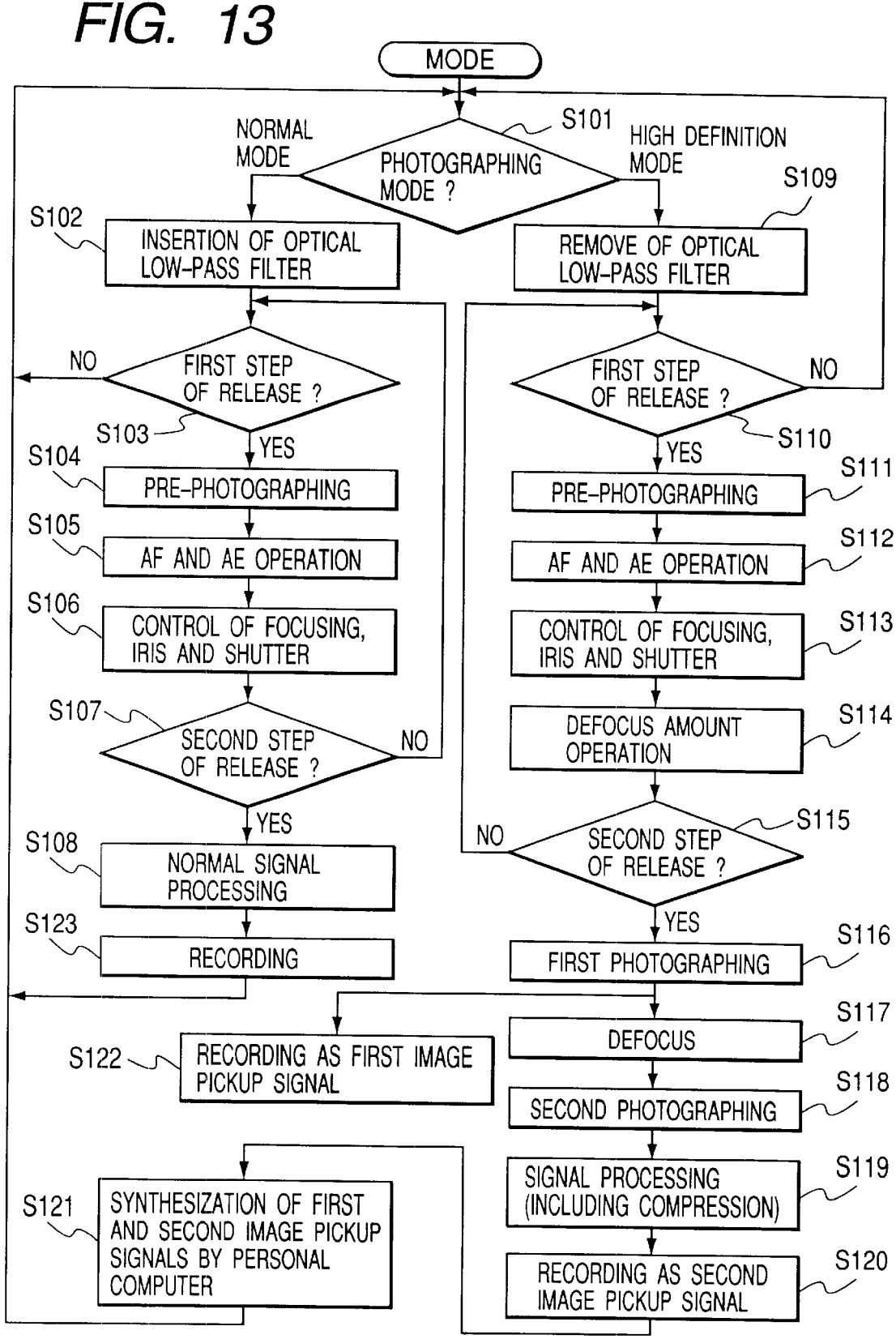
FIG. 13 is a flow chart illustrating an image pickup operation according to the second embodiment of the invention.

FIG. 12 is a block diagram showing a digital camera according to a second embodiment of the invention, and FIG. 13 is a flow chart illustrating the image pickup operation of the second embodiment. Different points from the first embodiment will be described in the following. The first photographing is performed in an in-focus state and recorded as the first image pickup signal in the recording device 7 without compressing, or if compressed, at a low compression factor. The second photographing is performed in an out-of-focus state not allowing color moire, compressed through JPEG or the like by the signal processing unit 10, and stored in the recording device 7 as the second image pickup signal.

Thereafter, by using a personal computer 30, the luminance signal Y is generated from the first image pickup signal, and CR and CB signals are generated from the second image pickup signal. The positions of the CR and CB signals are corrected by referring to the Y signal to form CRr and CBr signals. From the signals Y, CRr and CBr, an RGB signal is generated.

In this embodiment, although the personal computer reads the image information from the recording device 7, it may be read the information directly from the memory 6.

This embodiment will be described more in detail with reference to FIGS. 12 and 13. The normal photographing mode which executes the processes at Steps S101 to S108 and at Step S123 is the same as the first embodiment, and so the description thereof is omitted. Only the high definition photographing mode will be described.

When the high definition photographing mode is selected at Step S101, the optical low-pass filter 3 is moved to the outside of the optical path at Step S109.

At Step S110 when the shutter release button is half-depressed, the pre-photographing is performed for AE (exposure control) and AF (focus control) at Steps S111 to S113. The operation is the same as the first embodiment, and so the description thereof is omitted. The method of forming a blurred image at Step S114 is the same as the first embodiment.

At Step S115 when the shutter release button is depressed to the two steps, the first photographing is performed at Step S116 by using the iris value F and shutter speed in an in-focus state determined by the pre-photographing.

Electric charges accumulated in the image pickup element are transferred in the vertical and horizontal directions and converted into a digital signal by the A/D convertor.

In parallel to the charge transfer in the image pickup element, at Step S117 the lens is driven in accordance with the defocus amount supplied from the defocus amount determining unit for the second photographing.

In parallel to the process at Step S117, the first image pickup signal after the charge transfer and A/D conversion is recorded in an external recording medium or the like in the recording device 7 at Step S122.

After electric charges of all pixels of the image pickup element 4 are transferred, at Step S118 the second photographing is performed to record the second image signal from the image pickup element in the memory 6.

At Step S119 the second image signal stored in the memory 6 is supplied to the signal processing unit 18 to be processed thereat, and compressed through JPEG or the like.

At Step S120 the second image pickup signal is supplied to the recording device 7 and stored therein in the form of paired first and second image pickup signals.

At Step S121 the first and second image pickup signals recorded in the recording device 7 are read by the personal computer 30 or the like which synthesizes the first and second image pickup signals on the display screen thereof.

By using the same method as the first embodiment, the computer generates the luminance signal Y from the first image pickup signal of the paired first and second image pickup signals, and CR and CB signals from the second image pickup signal. The positions of the CR and CB signals are corrected by referring to the signal Y to generate signals CRr and CBr. From the signals Y, CRr and CBr, an RGB image signal is generated. In this manner, an image signal of one frame is formed. The luminance step is eliminated at the same time.

In this embodiment, the first image pickup signal used for the generation of the luminance signal is recorded in a non-compressed state or at a low compression factor, and the second image pickup signal used for the generation of the chrominance signals is recorded in a compressed state through JPEG or the like. Accordingly, the use amount of a recording medium can be reduced.

Since the luminance signal containing high frequency components is not compressed, an image signal of a good resolution can be formed.

Since the chrominance signals are generated through blurred photographing and have a narrow bandwidth, it is possible to increase the compression factor.

The non-compressed first image pickup signal and the compressed second image pickup signal are recorded as a pair, and the external computer synthesizes the paired first and second image pickup signals. It is therefore unnecessary for the camera to mount a signal processing circuit.

As described so far, according to the embodiments, the luminance signal is generated from the first image pickup signal obtained in an in-focus state, and the chrominance signals are generated from the second image pickup signal obtained in a defocused state shifted from the in-focus state. Therefore, the luminance signal of high definition corresponding to the number of pixels of the image pickup element can be generated, and the chrominance signals without color moire can be generated because of a predetermined defocus amount, even if the optical low-pass filter is not used. These signals are synthesized so that an image of good quality and high definition can be generated without color moire.

The lens driver table is provided which stores the lens defocus amount corresponding to the lens iris value. In accordance with the defocus amount read from the lens driver table, the defocus amount from the in-focus state is determined. Therefore, the defocus amount not allowing color moire can be determined correctly and quickly with ease so that a shutter chance is not missed and an image of high quality can be formed.

The lens iris is made not to broaden over a predetermined iris value while the first and second image pickup signals are picked up. Accordingly, the photographing conditions while the first and second image pickup signals are picked, are not changed. The defocus amount for the chrominance signal relative to the high definition luminance signal can be set correctly so that an image of high quality can be formed.

Color moire can be reliably eliminated without lowering the resolution unnecessarily, and the optimum defocus amount can be set with high precision. Accordingly, color bleeding during synthesization with the luminance signal can be prevented which is otherwise caused by a large area of a blurred image formed through excessive blurring.

Since the lens is defocused on the pre-focus side, a portion of an object is not focused to be unable to blur. Defocusing is therefore realized reliably.

Image quality deterioration through compression is suppressed for the luminance signal requiring high definition, whereas the chrominance signals having a narrow bandwidth and not being degraded by compression are compressed to reduce the use amount of the memory and improve the memory efficiency.

The position difference of an image between the first and second image pickup signals is detected and corrected to thereafter synthesize them. Accordingly, an image of high quality and high grade without color blurring can be formed.

Since luminance step removing means for removing a step of a luminance signal level is provided, a luminance step to be caused by color filters can be removed. Therefore, an image of high definition and high quality can be formed without luminance variation and without deterioration.

Since the effects of a time lag between the first and second photographing can be minimized, a position difference between luminance and chrominance signals and a shift of an object image can be minimized ensuring high definition photographing.

It is possible to selectively use the normal photographing mode using the optical low-pass filter and the high definition photographing mode with the retracted optical low-pass filter. Accordingly, these modes can be selectively used in accordance with the photographing conditions and objects, and various photographing scenes can be dealt with. The photographing mode can be optimized in accordance with the photographing scene.

The luminance signal is generated from the first image pickup signal, and the chrominance signals are generated from the second image pickup signal obtained in a defocused state shifted from the in-focus state. Therefore, the luminance signal of high definition corresponding to the number of pixels of the image pickup element can be generated, and the chrominance signals without color moire can be generated because of a predetermined defocus amount. These signals are synthesized so that an image of good quality and high definition can be generated without color moire.

The iris value is fixed to a predetermined iris value while the first and second image pickup signals are picked up. Accordingly, the photographing conditions while the first and second image pickup signals are picked, are not changed. The defocus amount for the chrominance signal relative to the high definition luminance signal can be set correctly so that an image of high quality can be formed.

A position difference between luminance and color difference signals can be corrected reliably so that an image of high quality without color blurring can be formed.

The optimum defocus amount capable of reliably eliminating color moire can be set with high precision without lowering the resolution unnecessarily.

Since the paired luminance and chrominance signals are recorded, an external computer or the like can be used for signal synthesization. It is therefore unnecessary for a camera to mount a signal processing circuit, so that the structure of the camera can be simplified.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
    (A) image pickup means for picking up an image and outputting an image pickup signal;
    (B) control means for performing a first photographing in an in-focus state to obtain a first image pickup signal and performing a second photographing in a state defocused by a predetermined amount from the in-focus state to obtain a second image pickup signal; and
    (C) signal processing means for generating a luminance signal in accordance with the first image pickup signal, and chrominance signals in accordance with the second image pickup signal.

2. An image pickup apparatus according to claim 1, further comprising defocus amount setting means for setting a defocus amount, said defocus amount setting means including a lens driver table storing a defocus amount of a lens relative to a lens iris value, and wherein the lens is defocused from the in-focus state in accordance with the defocus amount read from the lens driver table.

3. An image pickup apparatus according to claim 2, wherein the lens is defocused from the in-focus state in accordance with the defocus amount read from the lens driver table of said defocus amount setting means and in accordance with a zoom magnification factor.

4. An image pickup apparatus according to claim 3, wherein an iris of the lens is set not to broaden over a predetermined iris value while the first and second image pickup signals are picked up.

5. An image pickup apparatus according to claim 3, wherein the defocus amount is set so that a blurring amount of an image on an image pickup plane becomes about a twofold of a diameter of a circle of confusion.

6. An image pickup apparatus according to claim 5, wherein an iris of the lens is fixed while the first and second image pickup signals are picked up, and an exposure control is performed by using an electronic shutter for controlling an accumulation time of said image pickup means or a mechanical shutter for mechanically controlling an incident light amount.

7. An image pickup apparatus according to claim 2, wherein in picking up the second image pickup signal, the lens is set to a position on a pre-focus side relative to a position of the lens set in picking up the first image pickup signal.

8. An image pickup apparatus according to claim 1, further comprising a recording medium for recording the image pickup signal, wherein said signal processing means records the first image pickup signal without compression, or if compressed, at a low compression factor, in said recording medium, and records the second image pickup signal compressed at a compression factor higher than that of the first image pickup signal in said recording medium.

9. An image pickup apparatus according to claim 1, further comprising position difference detection means for detecting a position difference of an image between the first and second image pickup signals, and position difference correction means for correcting the position difference in accordance with an output of said position difference detection means, in order to synthesize the first and second image pickup signals.

10. An image pickup apparatus according to claim 1, further comprising luminance step removing means for removing a step of a luminance signal level.

11. An image pickup apparatus according to claim 10, wherein said luminance step removing means includes filtering means for removing a luminance step and edge discriminating means, wherein an area discriminated as an edge by said edge discriminating means is not subjected to filtering by said filtering means.

12. An image pickup apparatus according to claim 10, wherein said luminance step removing means includes pixel averaging means for removing a luminance step by pixel average calculation and edge discriminating means, wherein an area discriminated as an edge by said edge discriminating means is not subjected to the pixel average calculation by said pixel averaging means.

13. An image pickup apparatus according to claim 1, wherein setting the defocused state for picking up the second image pickup signal is executed while electric charges accumulated for picking up the first image pickup signal are transferred.

14. An image pickup apparatus according to claim 1, wherein picking-up of the first and second image pickup signals is sequentially performed each time one release operation is performed.

15. An image pickup apparatus according to claim 1, further comprising:
    an optical low-pass filter detachably mounted in an incident light optical path of said image pickup means; and
    mode switching means for switching between a first photographing mode and a second photographing mode, wherein in the first photographing mode, said optical low-pass filter is retracted from the incident light optical path for picking up the first and second image pickup signals, and in the second photographing mode, said optical low-pass filter is entered into the incident light optical path to perform a photographing operation.

16. An image pickup apparatus according to claim 15, wherein in the first photographing mode, an iris priority photographing is performed, and in the second photographing mode, a shutter speed priority photographing is performed.

17. An image pickup apparatus comprising:
    (A) means for inputting a first image pickup signal and a second image pickup signal both picked up in a relative state defocused by a predetermined amount;
    (B) luminance signal generating means for generating a luminance signal from the first image pickup signal;
    (C) chrominance signal generating means for generating chrominance signals from the second image pickup signal; and
    (D) control means for performing an iris priority photographing by fixing an iris while the first and second image pickup signals are picked up.

18. An image pickup apparatus according to claim 17, further comprising defocus amount setting means for setting a defocus amount, said defocus amount setting means including a lens driver table storing a defocus amount of a lens relative to a lens iris value, and wherein the lens is defocused from the in-focus state in accordance with the defocus amount read from the lens driver table.

19. An image pickup apparatus according to claim 18, wherein the lens is defocused from the in-focus state in accordance with the defocus amount read for the lens driver table of said defocus amount setting mens and in accordance with a zoom magnification factor.

20. An image pickup apparatus according to claim 19, wherein the defocus amount is set so that a blurring amount of an image on an image pickup plane becomes about a twofold of a diameter of a circle of confusion.

21. An image pickup apparatus according to claim 17, further comprising a recording medium for recording the image pickup signal, wherein said signal processing means records the first image pickup signal without compression, or if compressed, at a low compression factor, in said recording medium, and records the second image pickup signal compressed at a compression factor higher than that of the first image pickup signal in said recording medium.

22. An image pickup apparatus according to claim 17, wherein said control means controls so that setting the defocused state for picking up the second image pickup signal is executed while electric charges accumulated for picking up the first image pickup signal are transferred.

23. An image pickup apparatus according to claim 17, further comprising:

an optical low-pass filter detachably mounted in an incident light optical path of said image pickup means; and mode switching means for switching between a first photographing mode and a second photographing mode, wherein in the first photographing mode, said optical low-pass filter is retracted from the incident light optical path for picking up the first and second image pickup signals, and in the second photographing mode, said optical low-pass filter is entered into the incident light optical path to perform a photographing operation.

24. An image processing apparatus comprising:

(A) means for inputting a first image pickup signal and a second image pickup signal both picked up in a relative state defocused by a predetermined amount;

(B) luminance signal generating means for generating a luminance signal from the first image pickup signal;

(C) luminance step removing means for removing a step of a level of the luminance signal;

(D) chrominance signal generating means for generating chrominance signals from the second image pickup signal;

(E) position difference correcting means for correcting a relative position difference between the luminance signal with the removed luminance step and the chrominance signals; and (F) output means for outputting the luminance and chrominance signals with the position difference being corrected by said position difference correcting means.

25. An image processing apparatus according to claim 24, further comprising defocus amount setting means for setting a defocus amount, said defocus amount setting means including a lens driver table storing a defocus amount of a lens relative to a lens iris value, and wherein the lens is defocused from the in-focus state in accordance with the defocus amount read from the lens driver table.

26. An image processing apparatus according to claim 25, wherein the lens is defocused from the in-focus state in accordance with the defocus amount read from the lens driver table of said defocus amount setting means and in accordance with a zoom magnification factor.

27. An image processing apparatus according to claim 26, wherein the defocus amount is set so that a blurring amount of an image on an image pickup plane becomes about a twofold of a diameter of a circle of confusion.

28. An image processing apparatus according to claim 24, further comprising a recording medium for recording the image pickup signal, wherein said signal processing means records the first image pickup signal without compression, or if compressed, at a low compression factor, in said recording medium, and records the second image pickup signal compressed at a compression factor higher than that of the first image pickup signal in said recording medium.

29. An image processing apparatus according to claim 24, wherein said luminance step removing means includes filtering means for removing a luminance step and edge discriminating means, wherein an area discriminated as an edge by said edge discriminating means is not subjected to filtering by said filtering means.

30. An image processing apparatus according to claim 24, wherein said luminance step removing means includes pixel averaging means for removing a luminance step by pixel average calculation and edge discriminating means, wherein an area discriminated as an edge by said edge discriminating means is not subjected to the pixel average calculation by said pixel averaging means.

31. An image processing apparatus according to claim 1, wherein said signal processing means outputs the first image pickup signal in a non-compression state and the second image pickup signal in a compression state, to an externally connected computer.

* * * * *

UNITED STATES PATENT AND TRADEMARK OFFICE
CERTIFICATE OF CORRECTION

PATENT NO.    : 6,421,087 B1
DATED         : July 16, 2002
INVENTOR(S)   : Eiichiro Ikeda It is certified that error appears in the above-identified patent and that said Letters Patent is hereby corrected as shown below:

Column 2,
Line 35, "mens" should read -- means --.

Column 6,
Line 49, "defocussing" should read -- defocusing --.

Column 7,
Line 46, "conversion-is" should read -- conversion is --.

Column 12,
Line 42, "be" should be deleted.

Signed and Sealed this

Twenty-eighth Day of January, 2003

JAMES E. ROGAN
*Director of the United States Patent and Trademark Office*